United States Patent
Kim et al.

(10) Patent No.: US 12,083,490 B2
(45) Date of Patent: Sep. 10, 2024

(54) MICROWAVE REACTOR

(71) Applicant: KOREA INSTITUTE OF SCIENCE AND TECHNOLOGY, Seoul (KR)

(72) Inventors: Taejung Kim, Seoul (KR); Jungyeob Ham, Seoul (KR); Young Tae Park, Seoul (KR); Pilju Choi, Seoul (KR); Joonyeon Chang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/590,292

(22) Filed: Feb. 1, 2022

(65) Prior Publication Data

US 2022/0314191 A1    Oct. 6, 2022

(30) Foreign Application Priority Data

Apr. 1, 2021 (KR) .......................... 10-2021-0042811

(51) Int. Cl.
*B01J 19/12* (2006.01)
*B01J 19/24* (2006.01)

(52) U.S. Cl.
CPC ........... *B01J 19/126* (2013.01); *B01J 19/243* (2013.01)

(58) Field of Classification Search
CPC .............................. B01J 19/126; B01J 19/243; B01J 2219/1215; B01J 2219/1269; B01J 2219/1293; B01J 19/124; A62D 3/10
See application file for complete search history.

(56) References Cited

U.S. PATENT DOCUMENTS

| | | |
|---|---|---|
| 7,001,629 B1 | 2/2006 | Mengal et al. |
| 7,976,790 B2 | 7/2011 | Cheung |
| 8,263,917 B2 | 9/2012 | Matsuzawa et al. |
| 2017/0120205 A1* | 5/2017 | Dahms ................ B01F 35/4121 |
| 2021/0100864 A1 | 4/2021 | Ham et al. |

FOREIGN PATENT DOCUMENTS

| | | | |
|---|---|---|---|
| CN | 110882666 A | * | 3/2020 |
| JP | 2010-192147 A | | 9/2010 |
| KR | 10-1996-7002505 A | | 4/1996 |
| KR | 10-2000-0015867 A | | 3/2000 |
| KR | 10-2006-0085093 A | | 7/2006 |

(Continued)

OTHER PUBLICATIONS

A.J. Buttress et al "Design and optimisation of a microwave reactor for kilo-scale polymer synthesis" (Apr. 5, 2019) (Year: 2019).*

(Continued)

*Primary Examiner* — Luan V Van
*Assistant Examiner* — Shizhi Qian
(74) *Attorney, Agent, or Firm* — Birch, Stewart, Kolasch & Birch, LLP

(57) ABSTRACT

According to an aspect of the disclosure, there is provided a microwave reactor including a container for storing a bath fluid, a tube including an inlet at one end through which a target fluid is introduced, an outlet at another end through which the target fluid is discharged, wherein at least a portion of the tube is submerged in the bath fluid, and at least one radiator located outside the container and configured to irradiate microwaves into the container.

7 Claims, 3 Drawing Sheets

(56) References Cited

FOREIGN PATENT DOCUMENTS

| KR | 10-2021-0040710 A | 4/2021 |
|---|---|---|
| WO | WO 2019/043058 A1 | 3/2019 |

OTHER PUBLICATIONS

Nishioka et al "Single-Mode Microwave Reactor Used for Continuous Flow Reactions under Elevated Pressure" (2013) (Year: 2013).*
Li et al ("High-temperature dielectric properties and pyrolysis reduction characteristics of different biomass-pyrolusite mixtures in microwave field" Date: Sep. 26, 2019) (Year: 2019).*
Thomas-Hillman et al ("Realising the environmental benefits of metal-organic frameworks: recent advances in microwave synthesis" May 22, 2018). (Year: 2018).*
Tampieri et al ("Microwave-Assisted Aldol Condensation of Furfural and Acetone over Mg—Al Hydrotalcite-Based Catalysts" Date: Aug. 4, 2020) (Year: 2020).*
Matsuzawa et al ("Isothermal Reactor for Continuous Flow Microwave-Assisted Chemical Reaction" 2012 (Year: 2012).*
Equilibar (Definition of back pressure regulator) (Year: 2014).*
Korean Office Action for Korean Application No. 10-2021-0042811, dated Sep. 15, 2022, with English translation.

* cited by examiner

MICROWAVE REACTOR

CROSS-REFERENCE TO RELATED APPLICATION

This application is based on and claims priority under 35 U.S.C. § 119 to Korean Patent Application No. 10-2021-0042811, filed on Apr. 1, 2021, in the Korean Intellectual Property Office, the disclosure of which is incorporated by reference herein in its entirety.

BACKGROUND

1. Field

The disclosure relates to a microwave reactor.

2. Description of the Related Art

Methods that may be used to extract natural ingredients from natural products such as plants and animals include solvent extraction using an organic solvent and extraction using hot water. When an organic solvent is used, harmful effects may affect the human body due to a residual solvent, and when hot water is used, decomposition or denaturation of ingredients may occur due to damage by heat.

For example, a low-temperature extraction method as described in Korean Patent Publication No 10-2006-0085093 may be used to overcome the disadvantages of a natural ingredient extraction method of the related art. The low-temperature extraction method reduces denaturation of active ingredients, but there is still a problem in that use of a solvent is still required.

A natural product processing technology using a microwave heating device has been developed. A microwave heating device is also referred to as an ultra-high frequency oven or a microwave oven, and microwaves are widely used in everyday life.

In the field of natural product chemistry, for example, a microwave heating device is used in a processing process for extracting natural active ingredients by heating and refluxing an extractant. For example, Korean Patent Application Publication No. 10-1996-7002505 discloses a method and device for processing natural products by using microwaves.

SUMMARY

According to an aspect, there is provided a microwave reactor configured to induce a reaction of a target fluid.

Additional aspects will be set forth in part in the description which follows and, in part, will be apparent from the description, or may be learned by practice of the presented embodiments of the disclosure.

According to an aspect of the disclosure, there is provided a microwave reactor including a container in which a bath fluid is disposed, a tube including an inlet at one end through a target fluid is introduced, and an outlet at another end through which the target fluid is discharged, wherein at least a portion of the tub is submerged in the bath fluid, and at least one radiator located outside the container and configured to irradiate microwaves into the container.

Here, the container may include at least one of a thermoplastic, glass, polytetrafluoroethylene (PTFE), perfluoroalkoxy alkane (PFA), methyl methacrylate, polyetherimide, aluminum oxide, and quartz.

Here, the bath fluid may include at least one of water, C5-C10 alcohol, C2-C6 diol, C3-C6 triol, a polymer thereof, and a mixture thereof.

Here, the tube may include at least one of a thermoplastic, glass, polytetrafluoroethylene (PTFE), perfluoroalkoxy alkane (PFA), methyl methacrylate, polyetherimide, aluminum oxide, and quartz.

Here, at least part of the tube, which is submerged in the bath fluid, has a spiral shape.

A pressure regulator may be arranged in the inlet.

Here, a pressure regulator may be arranged in the outlet.

The microwave reactor may further include a temperature measuring unit configured to measure a temperature of the bath fluid and a cooling unit configured to cool the bath fluid.

The microwave reactor may further include a temperature controller configured to control the temperature of the bath fluid by operating the cooling unit, based on the temperature measured by the temperature measuring unit.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
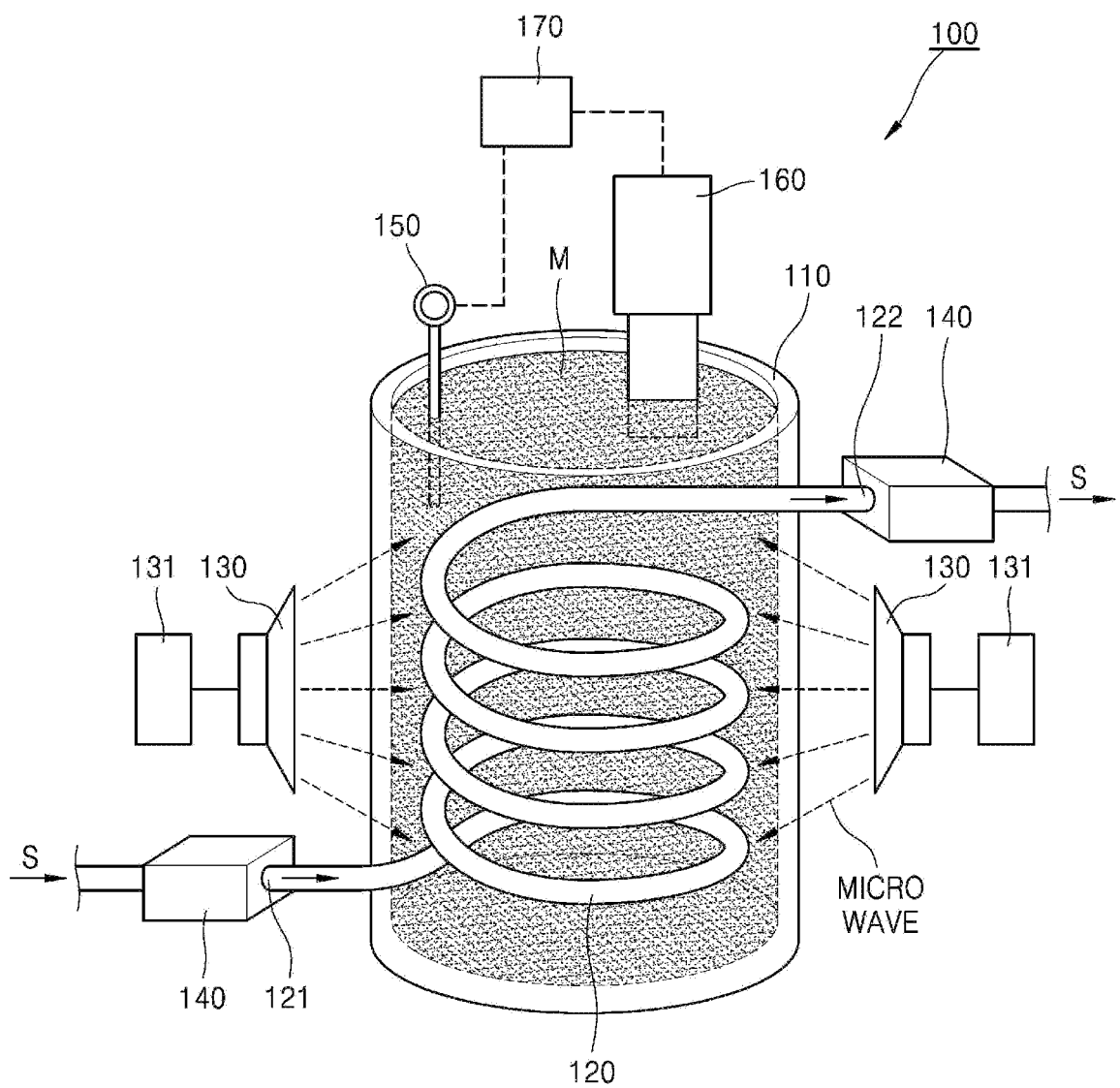
FIG. 1 is a schematic perspective view of a microwave reactor according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the disclosure according to an exemplary embodiment will be described in detail with reference to the accompanying drawings. In addition, in the present specification and drawings, redundant descriptions are omitted by using the same reference numerals for components having substantially the same configuration, and the size and/or length ratio may be exaggerated to help understanding in the drawings.

The disclosure will become apparent with reference to embodiments described below in detail in conjunction with the accompanying drawings. However, the disclosure is not limited to embodiments disclosed below and may be embodied in various different forms, the embodiments are merely intended to complete the disclosure and provided to fully inform those of ordinary skill in the art to which the disclosure belongs of the scope of the disclosure, and the disclosure is only defined by the scope of the claims.

In addition, the terms used herein is to describe the embodiments and is not intended to limit the disclosure. Throughout the present specification, the singular also includes the plural unless the phrase specifically states otherwise. The terms "comprises' and/or "comprising" used herein do not preclude existence or addition of one or more different components, steps, operations, and/or devices to components, steps, operations, and/or devices described herein. While such terms as "first," "second," etc., may be used to describe various components, such components must not be limited to the above terms. The above terms are used only to distinguish one component from another.

FIG. 1 is a schematic perspective view of a microwave reactor according to an embodiment.

As shown in FIG. 1, a microwave reactor 100 according to an embodiment may include a container 110, a tube 120, a radiator 130, a pressure regulator 140, a temperature measuring unit 150, a cooling unit 160, and a temperature controller 170. The container 110 has a cylindrical barrel shape. In the container 110, there is bath fluid M.

The container 110 according to the embodiment has a cylindrical barrel shape, but the disclosure is not limited thereto. Namely, there is the bath fluid M in the container 110 according to the disclosure and at least a portion of the tube 120 is submerged in the bath fluid M. Besides that, there is no particular limitation on the shape of the container 110 otherwise.

The container 110 according to the embodiment may be configured as an airtight container. Particularly, when the bath fluid M is heated greater than or equal to a boiling point, it is desired that the container 110 is configured as an airtight container.

Any material through which microwaves may be transmitted may be applied as a material of the container 110 without limitation. That is, a material of the container 110 includes a material through which microwaves may be transmitted, so that when microwaves are generated by the radiator 130 and irradiated into the container 110, the microwaves also reach the tube 120 and a target fluid S inside the tube 120 causes a thermal reaction. That is, at least a portion or whole of the container 110 may include a microwave transparent material or a semi-transparent material. The microwave transparent material refers to a material that allows a substantial portion of microwave energy irradiated from a microwave generator to pass through and to reach the inside of a reaction vessel. Examples of the microwave transparent material may include thermoplastic, glass, or a combination thereof. The microwave transparent material may include Teflon such as glass-filled Teflon, polytetrafluoroethylene (PTFE), and perfluoroalkoxy alkane (PFA), poly(methyl methacrylate, PMMA), polyetherimide (PEI), aluminum oxide, glass, quartz, or a combination thereof.

The bath fluid M in the container 110 is a material capable of transmitting microwaves to the tube 120, and any fluid having an appropriate heat capacity may be applied without limitation. For example, the bath fluid M may include water, C5-C10 alcohol, C2-C6 diol, C3-C6 triol, a polymer thereof, or a mixture thereof, and may be formed using a solvent of the target fluid S moving to the tube 120.

A cooling action of actively lowering temperature of the bath fluid M is performed by the cooling unit 160 and the temperature controller 170, which is described in detail below.

A reaction occurs in the tube 120 while the target fluid S flows into the tube 120.

The tube 120 is accommodated in the container 110, and at least a portion of the tube 120 is submerged in the bath fluid M.

An inlet 121 is arranged at one end of the tube 120, and the target fluid S is introduced through the inlet 121.

An outlet 122 is arranged at another end of the tube 120, and the target fluid S is discharged through the outlet 122.

According to the present embodiment, the inlet 121 is installed below the outlet 122, but the disclosure is not limited thereto. That is, according to the disclosure, heights of the inlet 121 and the outlet 122 are not particularly limited. For example, according to the disclosure, the inlet 121 may be arranged above the outlet 122.

At least part of a portion of the tube 120, which is submerged in the bath fluid M, has a spiral shape. The spiral shape of the tube 120 is to help a reaction of the target fluid S by expanding an area where microwaves are irradiated to the target fluid S in a limited space inside the container 110.

Any material through which microwaves may be transmitted may be applied as a material of the tube 120 without limitation. That is, the tube 120 includes a material through which microwaves may be transmitted, so that a microwaves reach the tube 120 and the target fluid S inside the tube 120 causes a thermal reaction. That is, at least a portion or whole of the tube 120 may include a microwave transparent material or a semi-transparent material. The microwave transparent material refers to a material that allows a substantial portion of microwave energy irradiated from a microwave generator to pass through and to reach the inside a reaction vessel. Examples of the microwave transparent material may include thermoplastic, glass, or a combination thereof. The microwave transparent material may be Teflon such as glass-filled Teflon, polytetrafluoroethylene (PTFE), and perfluoroalkoxy alkane (PFA), poly(methyl methacrylate, PMMA), polyetherimide (PEI), aluminum oxide, glass, quartz, or a combination thereof.

Meanwhile, the radiator 130 is an apparatus located outside the container 110 and arranged to irradiate microwaves into the container 110.

The radiator 130 according to the present embodiment includes a pair of radiators 130. The pair of radiators 130 are arranged to face each other and controlled by a radiation controller 131.

Although the radiator 130 according to the present embodiment includes the pair of the radiators 130, the disclosure is not limited thereto. That is, a radiator according to the disclosure includes at least one radiator, and the number thereof is not particularly limited.

The radiator 130 includes a microwave generator. The microwave generator may include a commercially available magnetron, and may include, for example, a microwave generator (model no. 908005) of CEM Corporation.

The radiation controller 131 is operated by controlling the radiator 130 according to a predetermined algorithm or receiving a direct command from a user. Specifically, the radiation controller 131 may include hardware such as an electric circuit board and an integrated circuit chip, software, firmware, and the like, and may be operated under the control by a user or a control algorithm.

Meanwhile, the pressure regulator 140 may be arranged at the inlet 121 and the outlet 122.

The pressure regulator 140 may include a back pressure regulator, and regulates flow of the target fluid S flowing through the tube 120 to be optimally maintained for a response reaction.

The microwave reactor 100 according to the present embodiment includes the pressure regulator 140, but the disclosure is not limited thereto. That is, the microwave reactor 100 according to the disclosure may not include a pressure regulator.

The temperature measuring unit 150 measures temperature of the bath fluid M, and the cooling unit 160 cools the bath fluid M. Also, the temperature controller 170 controls temperature of the bath fluid M by operating the cooling unit 160 based on temperature measured by the temperature measuring unit 150.

Specifically, the temperature measuring unit 150 includes an electronic or mechanical temperature sensor, and transmits temperature measurement data to the temperature controller 170 by measuring temperature of the bath fluid M.

The cooling unit 160 includes a cooling apparatus that lowers temperature of the bath fluid M, and the cooling apparatus may include a heat pump, a thermoelectric element, a coolant cooling unit, and the like.

The temperature controller 170 cools the bath fluid M by operating the cooling unit 160 when temperature measured by the temperature measuring unit 150 is greater than reference temperature, thereby lowering the temperature of the bath fluid M. Here, the reference temperature may vary according to the type of the target fluid S and a reaction process. The reference temperature is determined by determining a temperature range in which a reaction of the target fluid S may optimally occur and considering the determined temperature range.

The temperature controller 170 may include hardware such as an electric circuit board and an integrated circuit chip, which may process temperature measurement data, software, firmware, and the like, and may be operated under the control by a user or a control algorithm.

In the present embodiment, the temperature controller 170 may automatically regulate temperature of the bath fluid M based on predetermined reference temperature, but the disclosure is not limited thereto. That is, according to the disclosure, a user may regulate temperature of the bath fluid M by seeing for himself/herself and determining temperature measured by the temperature measuring unit 150 and manually operating the cooling unit 160.

The microwave reactor 100 according to the present embodiment includes the temperature measuring unit 150, the cooling unit 160, and the temperature controller 170, but the disclosure is not limited thereto. That is, the microwave reactor 100 according to the disclosure may not include the temperature measuring unit 150, the cooling unit 160, and the temperature controller 170. In this case, a separate cooling apparatus may be included to cool the bath fluid M.

The microwave reactor 100 according to the present embodiment does not include an outermost container accommodating the container 110 and the radiator 130, but the disclosure is not limited thereto. That is, the microwave reactor 100 according to the disclosure can include the outermost container accommodating the container 110 and the radiator 130, and thus, microwaves generated by the radiator 130 may be prevented from being emitted to the outside.

Hereinafter, an operation of the microwave reactor 100 is described with reference to FIG. 1.

The target fluid S having a certain pressure is introduced into the inlet 121 through the pressure regulator 140.

The target fluid S flows into the tube 120, and because the tube 120 has a spiral shape, the target fluid S also moves in a spiral shape and eventually moves to the outlet 122.

The target fluid S that has moved to the outlet 122 moves to the next step through the pressure regulator 140.

Meanwhile, while the target fluid S flows through the tube 120, the radiator 130 operates and microwaves are radiated. The microwaves are sequentially irradiated to the container 110, the bath fluid M, the tube 120, and the target fluid S, thereby causing changes due to the microwaves, such as heating of the bath fluid M and the target fluid S. When the target fluid S causes a reaction by the microwaves, temperature thereof increases.

Meanwhile, the temperature measuring unit 150 measures temperature of the bath fluid M and transmits temperature measurement data to the temperature controller 170, and the temperature controller 170 monitors the temperature of the bath fluid M and operates the cooling unit 160 when the measured temperature is greater than predetermined reference temperature.

When the cooling unit 160 is operated, the bath fluid M is cooled and the temperature of the bath fluid M decreases. When the temperature of the bath fluid M decreases, temperature of the target fluid S may be decreased, and thus, the temperature of the target fluid S may be regulated by regulating the temperature of the bath fluid M. That is, the temperature of the target fluid S may be regulated to correspond to an optimum reaction temperature range by regulating the temperature of the bath fluid M.

According to the microwave reactor 100 of the present embodiment described hereinbefore, because the target fluid S is exposed to microwave radiation while flowing, a thermal reaction occurs, and thus, a continuous reaction may be embodied and productivity may be increased.

Also, according to the microwave reactor 100 of the present embodiment, at least a portion of the tube 120 through which the target fluid S flows is submerged in the bath fluid M, and microwaves are radiated from the outside of the container 110 in which the bath fluid M is disposed to induce a reaction of the target fluid S, and thus, temperature of the target fluid S may be regulated by regulating temperature of the bath fluid M. That is, the temperature of the target fluid S is regulated to correspond to an optimum reaction temperature range by monitoring and regulating the temperature of the bath fluid M, and thus, a high productivity may be embodied.

Furthermore, according to the microwave reactor 100 of the present embodiment, the tube 120 through which the target fluid S flows has a spiral shape, and this configuration may improve a reaction of the target fluid S by expanding an area where microwaves are irradiated to the target fluid S in a limited space inside the container 110.

Meanwhile, hereinafter, a natural product processing system using the microwave reactor 100 according to the present embodiment is described with reference to FIGS. 2 and 3.

Figure 2:
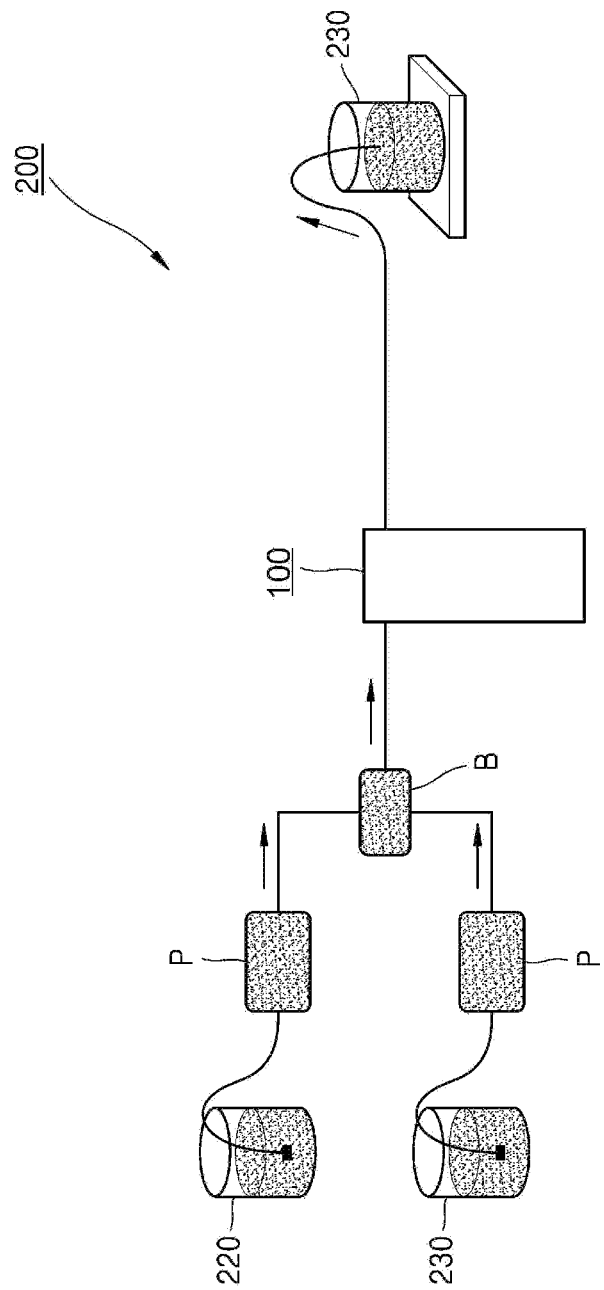
FIGS. 2 and 3 are examples of a natural product processing system using a microwave reactor according to the present embodiment.

A natural product processing system 200 shown in FIG. 2 is a system that transfers a sample and solvent including cannabidiolic acid (CBDA) to a microwave reactor 100 to continuously produce a processed product including cannabidiol (CBD) through a microwave decarboxylation reaction. Here, the microwave reactor from FIG. 1 may be applied as the microwave reactor in FIG. 2.

A hemp leaf extract and a solvent such as ethanol and ethyl acetate are in a first preparation container 220 of the natural product processing system 200, and a catalyst (acid catalyst) capable of amplifying decarboxylation as an additive is in a second preparation container 230.

A fluid in the first preparation container 220 and a fluid in the second preparation container 230 are transferred to a pump P and mixed in a mixer B, and then transferred to the microwave reactor 100.

In the microwave reactor 100, a processed product including cannabidiol (CBD) is continuously generated through a microwave decarboxylation reaction, and the generated processed product is transferred to a storage container 230. Here, a technology described in the applicant's Korean Patent Application No. 10-2019-0123362 may be applied as a microwave decarboxylation reaction technology.

Figure 3:
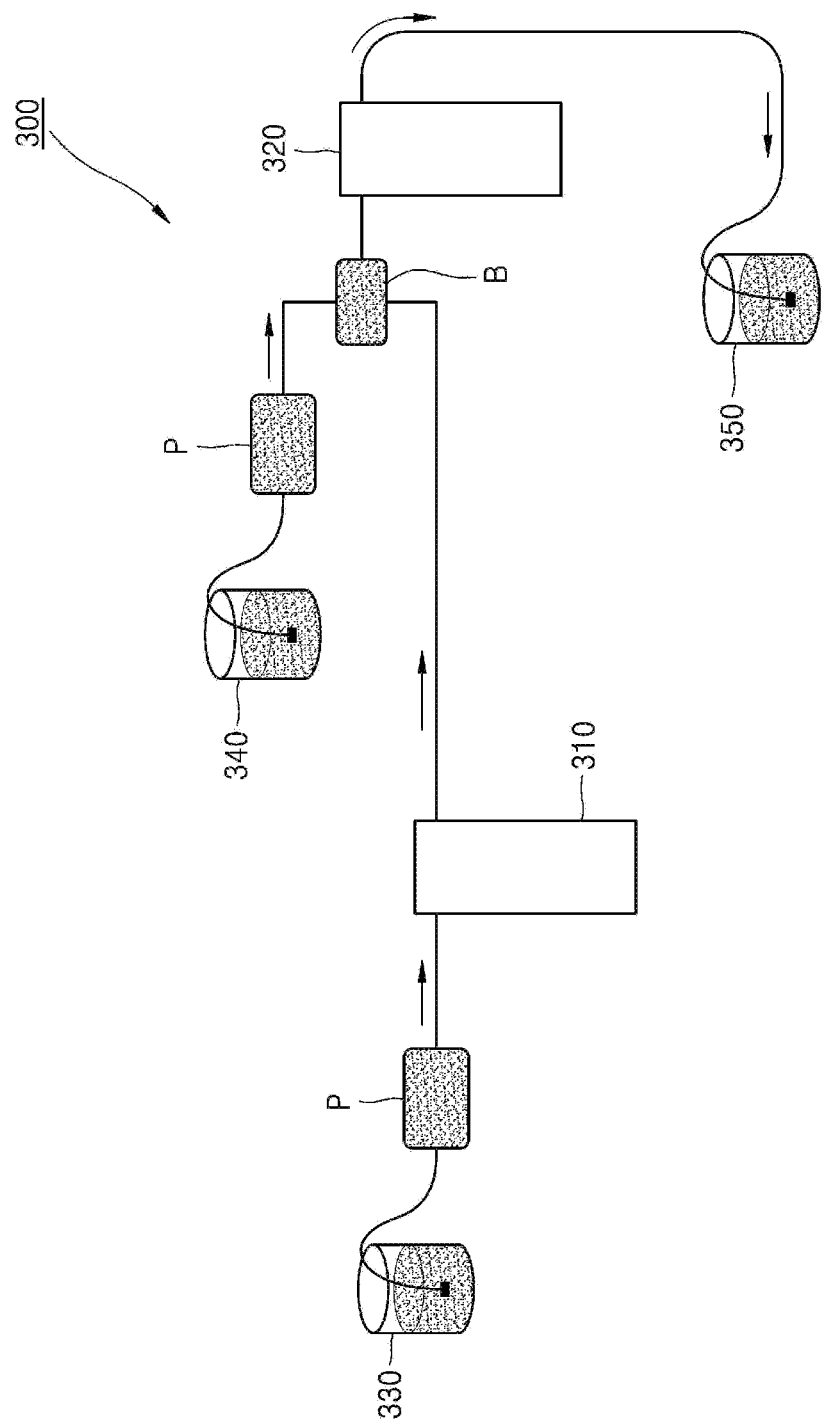

Hereinafter, a natural product processing system 300 shown in FIG. 3 is described.

First, a sample and solvent including cannabidiolic acid (CBDA) are transferred to a first microwave reactor 310 to continuously generate a first processed product including cannabidiol (CBD) through a microwave decarboxylation reaction and move the first processed product to the mixer B. The first processed product and an acid additive are mixed in the mixer B and then transferred to a second microwave reactor 320 to cause a intramolecular cyclization to continuously generate a second processed product. Here, the microwave reactor 100 may be applied as the first and second microwave reactors 310 and 320.

A hemp leaf extract and a solvent are in a first preparation container 330 of a natural product processing system 300 and transferred to the first microwave reactor 310 by the pump P.

A first processed product including cannabidiol (CBD) is continuously produced through a microwave decarboxylation reaction in the first microwave reactor 310. Here, a technology described in the applicant's Korean Patent Application No. 10-2019-0123362 may be applied as a microwave decarboxylation reaction technology.

Meanwhile, an acid additive is in a second preparation container 340, and is transferred to the mixer B by the pump P and mixed with the first processed product in the mixer B.

Next, a fluid mixed in the mixer B is transferred to the second microwave reactor 320 to cause intramolecular cyclization to continuously generate a second processed product, and the second processed product is transferred to a storage container 350. Here, a technology described in the applicant's Korean Patent Application Nos. 10-2019-0179810 and 10-2020-0073240 may be applied as an intramolecular cyclization technology.

As described hereinbefore, although examples of natural product processing apparatuses to which the microwave reactor 100 according to the present embodiment have been described, the microwave reactor 100 of the present embodiment may be applied to various processing apparatuses in addition to these application examples.

According to an aspect of the disclosure, because a target fluid is exposed to microwave radiation while flowing, the target fluid continuously reacts to increase productivity.

Also, according to an aspect of the disclosure, at least a portion of a tube through which the target fluid flows is submerged in a bath fluid, and microwaves are radiated from the outside of a container in which the bath fluid is disposed to induce a reaction of the target fluid, and thus, the reaction of the target fluid may be controlled by regulating temperature of the bath fluid.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

INDUSTRIAL APPLICABILITY

A microwave reactor according to the present embodiment may be applied to the industry that manufactures or uses the microwave reactor.

What is claimed is:

1. A microwave reactor comprising:
a container comprising a bath fluid disposed therein;
a tube including an inlet at one end though which a target fluid is introduced, and an outlet at another end through which the target fluid is discharged, wherein at least a portion of the tube is submerged in the bath fluid;
at least one radiator located outside the container and configured to irradiate microwaves into the container;
a temperature measuring unit configured to measure a temperature of the bath fluid within the container;
a cooling unit at least partially submerged in the bath fluid within the container and configured to cool the bath fluid; and
a temperature controller configured to control the temperature of the target fluid to correspond to an optimum reaction temperature range by controlling the temperature of the bath fluid by operating the cooling unit, based on the temperature measured by the temperature measuring unit;
wherein the microwaves irradiated from the at least one radiator heats the bath fluid and the target fluid together; and
wherein the temperature controller monitors the temperature of the bath fluid and operates the cooling unit when the temperature of the bath fluid is greater than a predetermined reference temperature to decrease the temperature of the bath fluid, thus the temperature controller regulates the temperature of the target fluid by regulating the temperature of the bath fluid.

2. The microwave reactor of claim 1, wherein the container comprises at least one of a thermoplastic, glass, polytetrafluoroethylene (PTFE), perfluoroalkoxy alkane (PFA), methyl methacrylate, polyetherimide, aluminum oxide, and quartz.

3. The microwave reactor of claim 1, wherein the bath fluid comprises at least one of water, C5-C10 alcohol, C2-C6 diol, C3-C6 triol, a polymer thereof, and a mixture thereof.

4. The microwave reactor of claim 1, wherein the tube comprises at least one of a thermoplastic, glass, polytetrafluoroethylene (PTFE), perfluoroalkoxy alkane (PFA), methyl methacrylate, polyetherimide, aluminum oxide, and quartz.

5. The microwave reactor of claim 1, wherein at least part of the tube, which is submerged in the bath fluid, has a spiral shape.

6. The microwave reactor of claim 1, wherein a pressure regulator is arranged in the inlet.

7. The microwave reactor of claim 1, wherein a pressure regulator is arranged in the outlet.

* * * * *